United States Patent
Celik et al.

[11] Patent Number: 5,914,440
[45] Date of Patent: Jun. 22, 1999

[54] METHOD AND APPARATUS REMOVAL OF SOLID PARTICLES FROM MAGNESIUM CHLORIDE ELECTROLYTE AND MOLTEN MAGNESIUM BY FILTRATION

[75] Inventors: Cesur Celik, Pointe-Claire; Pasquale Ficara, Verdun; Daniel Laroche, Pointe-Claire, all of Canada

[73] Assignee: Noranda Inc., Canada

[21] Appl. No.: 08/819,830

[22] Filed: Mar. 18, 1997

[51] Int. Cl.⁶ .................................................. C22B 9/02
[52] U.S. Cl. ........................... 75/407; 75/409; 75/412; 164/134; 204/245; 205/404; 266/209; 266/227
[58] Field of Search ............... 75/407, 409, 412; 266/209, 227; 204/245; 164/134; 205/404

[56] References Cited

U.S. PATENT DOCUMENTS

| | | | |
|---|---|---|---|
| 3,997,413 | 12/1976 | Fougner | 204/70 |
| 4,124,506 | 11/1978 | Dore | 210/69 |
| 4,200,618 | 4/1980 | Pitts | 423/163 |
| 4,228,144 | 10/1980 | Kono et al. | 423/498 |
| 4,265,659 | 5/1981 | Blome | 75/93 R |
| 4,394,271 | 7/1983 | Groteke | 210/773 |
| 4,428,984 | 1/1984 | Bienvenu | 75/407 |
| 4,551,218 | 11/1985 | Gesing et al. | 204/240 |
| 4,940,489 | 7/1990 | Cummings | 75/407 |
| 5,004,545 | 4/1991 | Wahl et al. | 210/510.1 |
| 5,028,036 | 7/1991 | Sane et al. | 266/227 |
| 5,030,482 | 7/1991 | Tadayon | 427/244 |
| 5,045,511 | 9/1991 | Bosomworth et al. | 501/85 |
| 5,205,346 | 4/1993 | Kuhn et al. | 164/134 |
| 5,322,546 | 6/1994 | Holsgrove et al. | 75/407 |
| 5,395,533 | 3/1995 | Su et al. | 210/668 |
| 5,728,239 | 3/1998 | Setzer et al. | 148/549 |

FOREIGN PATENT DOCUMENTS

| | | |
|---|---|---|
| 93/16829 | 9/1993 | WIPO . |
| 95/31401 | 11/1995 | WIPO . |

OTHER PUBLICATIONS

"Particle Removal In Pure Magnesium" by Dag Oymo, et al., Light Metals 1994, The Minerals, Metals & Materials Society, 1994.

Mills et al., *Light Metals*, 1994, 1001–1005, Month Unavailable.

*Primary Examiner*—Melvyn Andrews
*Attorney, Agent, or Firm*—Fitzpatrick, Cella, Harper & Scinto

[57] ABSTRACT

The present invention is concerned with a system for the filtration of molten material. The system is particularly useful for removing MgO impurities present in molten magnesium chloride electrolyte. The invention also comprises a method for removing solid particles from molten materials. Preferred molten materials include magnesium, aluminum, magnesium chloride electrolyte and aluminum electrolyte. The concentration of solid remaining in the molten material is less than 0.05 wt %.

17 Claims, 4 Drawing Sheets

METHOD AND APPARATUS REMOVAL OF SOLID PARTICLES FROM MAGNESIUM CHLORIDE ELECTROLYTE AND MOLTEN MAGNESIUM BY FILTRATION

FIELD OF THE INVENTION

The present invention is concerned with a method for the filtration of fused salt electrolyte or molten metal, more particularly anhydrous magnesium chloride and magnesium respectively.

BACKGROUND OF THE INVENTION

In the electrolytic production of magnesium, $MgCl_2$ is decomposed into liquid magnesium and chlorine in a fused salt electrolysis cell according to the following equation:

$$MgCl_2 => Mg_1 + Cl_{2(g)}$$

Conventionally, the electrolyte comprises $MgCl_2$, NaCl, $CaCl_2$ and other minor alkali & alkali earth chlorides which are well known in the art. A major problem associated with the magnesium chloride electrolyte is the presence of magnesium oxide (MgO), which is highly detrimental to the efficient operation of the electrolysis cell. For example,

- MgO migrates towards the cathode and coats it with a thin layer that has the effect of creating additional resistance to electrical conductivity and increases power consumption of the cell;
- the thin layer of MgO on the cathode also renders the latter less wettable, causing the formation of fine droplets of magnesium that are not easily recoverable from the electrolyte;
- the fine droplets of magnesium may then become coated with an oxide film and have their densities increased to a point where they are dragged into the sludge at the bottom of the cell. Further, the droplets may also prevent coalescence with other magnesium droplets and therefore never gain enough buoyancy force to be collected at the top of the cell. In either case, the consequence is that magnesium is lost;
- MgO settles and pulls electrolyte along with it to form a cement-like formation at the bottom of the cell, resulting in the necessity to frequently rebuild the cell, a costly procedure in terms of time and production lost; and
- MgO reacts with the graphite at the anode to produce carbon dioxide and magnesium chloride, thus increasing the anode to cathode distance and causing voltage drop, thus resulting in a significant decrease in the life of the cell.

The presence of other oxides like sulphates, which are only slightly soluble in electrolytes, also presents significant problems, since they greatly decrease the current efficiency, even in quantities as low as a few hundredths of one percent. Although the mechanisms are not well understood, it is believed that a magnesium sulphide layer may be formed on the surface of the cathode, thus causing reduced current efficiency. Moreover, the sulphate affects the surface chemistry of the salt in such a manner that a stable foam is produced above the electrolyte which tends to trap magnesium therein.

As most magnesium electrolytic cell feeds are derived from an aqueous chloride solution subsequently dehydrated to produce magnesium chloride, the presence of MgO, sulphates and $H_2O$ in the feed of electrolysis cells is a universal concern within the industry.

The presence of MgO is unfortunately almost unavoidable due to the thermodynamic equilibria existing in the cell. Further, water reacts with $MgCl_2$ to form MgO, which significantly aggravates the problem. In typical magnesium plants, there is generally a unit operation to eliminate the moisture and the MgO present in the feed material.

Several methods exist to eliminate water and magnesium oxide. Examples of these are as follows:

1) In U.S. Pat. No. 3,742,199, $MgCl_2$ prills ($MgCl_2 \cdot xH_2O$ -- 2 wt % MgO) produced in a fluid bed dryer are contacted with huge quantities of HCl gas in a dehydration fluid bed tower. This process drives off the moisture, prevents hydrolysis and formation of more MgO.

2) The Oriana smelter in Ukraine, and Avisma and SMZ smelters in Russia use a carbochlorination process which contacts melted hydrated $MgCl_2$ with carbon and chlorine in a shaft furnace. The reaction is between the MgO, water, the carbon and the chlorine to produce carbon dioxide, HCl and $MgCl_2$ (see Kh. L., Strelets, *"The chemistry and electrochemistry of magnesium production"*, translated by J. Schmora, Keter, Jerusalem, 1977 (also available as TT 7650003, U.S. Dept. Commerce, NTIS Springfield, Va., pp. 43–46).

3) Another known process, which is similar to the carbochlorination process, consist in contacting $CO+Cl_2$ with melted hydrated $MgCl_2$ in an agitated furnace. The mixture reacts with water and MgO to produce $CO_2$ and $MgCl_2$ and HCl. U.S. Pat. No. 4,800,003 discloses such process. In both methods discussed in paragraphs 1) and 2), as well as in this method, a large quantity of the water must react with reagents, thus slowing the kinetics and increasing the quantity of reagents required.

4) U.S. Pat. No. 5,565,080 uses a more efficient and sophisticated process in which no reducing agent is required and HCl contacts prills dissolved in electrolyte. The primary advantage of this method is that unlike the previous ones, it occurs at significantly lower temperatures (650° C. vs 750° C. or more); and the reagent only needs to react with the MgO fed to the chlorinator. Therefore, no magnesium chloride hydrolysis occurs because the thermodynamic driving force for hydrolysis is eliminated. Due to the above mentioned facts, the kinetics of this process are generally faster than most other processes.

All the methods mentioned above are chemical methods which involve injection of large volumes of reagent gases into fused chloride salts to prevent the formation of MgO and to reduce any MgO formed to $MgCl_2$. One of ordinary skill in the art can appreciate the level of engineering and materials selection complexity associated with such operations. In addition, the capital/operating expenses and the safety concerns related to supporting the above mentioned technologies can be quite prohibitive in terms of implementation, not to mentioned the potential environmental effect that a leak of HCl or chlorine gas would have.

Russian plants have been known to use an alternative physical method to separate solid MgO particles from fused salt baths (see Strelets, Kh. L. *"The Chemistry and Electrochemistry of Magnesium Production"* Translated by J. Schmorak, Keter, Jerusalem, 1977. Also available as TT 7650003, U.S. Dept. Commerce, NTIS Springfield Va., p. 131–143). The technology entails settling of MgO in a carnalite containing furnace. Since their electrolysis cells are monopolar, and thus, much more forgiving in terms of acceptable levels of MgO in the feed because the anode and the cathode are relatively apart from one another, this process is fairly successful. It involves allowing the feed to have a long retention time in a holding furnace. The longer the retention time, the greater MgO particles may settle. Depending on the particle size distribution of the oxide, the lowest MgO concentration available from this type of process is in the order of 0.2–0.5 wt %. Therefore, such electrolyte cannot be considered suitable for use with modem sophisticated multipolar magnesium electrolysis cells with high efficiency and throughput, because such cells generally require MgO level lower than 0.1 wt %, and most preferably lower than 0.05 wt %.

In the aluminum industry, gravity filtration for removal of large solid particles in molten aluminum is common practice. Typically, large pore ceramic foam filters are used for such filtration, as described for example by Mills et al. in *Light Metals*, 1994, 1001–1005. A number of studies have also been done with the use of other media such as ceramically bonded crushed alumina, high temperature fabric screens and monolithic extrusions (Apelian et al. in *Light Metals*, 1981, 735–750. The filtration technology can be easily applied to molten aluminum, since the size of the particles present therein is generally greater than 20 $\mu$m.

Die casting or gravity casting of metal components with less than 50 lbs. weight requires batch injection/filling of the molten metal into a preformed mold. Despite persistent efforts to prevent the formation of metal oxides, the latter still enter in the cast product during the casting step. Each time a fixed quantity of molten metal is ladled from the holding furnace into a mold, the freshly formed layer of metal oxides at the surface of the melt is disrupted and some metal oxides are introduced in the ladle.

Another problem in pressure/counter-pressure die casting operations involves the refinement of the molten metals from hydrogen and inclusions before casting parts therefrom. The thus treated metal is then pressurized to pump a predetermined volume from the holding vessel into a mold. Once the reservoir of molten metal in the holding vessel is depleted, the vacuum/pressure seal is broken and the empty vessel is replaced with a new vessel loaded with treated molten metal before casting operations are resumed. Such replacement of vessels requires approximately 10–20 minutes and penalizes the throughput of the casting equipment.

There is therefore a great need to develop a physical method to remove solid particles such as magnesium oxide from molten materials like magnesium chloride electrolyte or magnesium. Such method would be helpful in magnesium electrolysis by providing cleaner electrolyte. Further, the method could be advantageous if it may be coupled to die casting operations so that such operations may be conducted in a continuous manner without having to replace any empty vessels.

SUMMARY OF THE INVENTION

In accordance with the present invention, there is now provided a system for physically removing solid impurities in fused salts or molten materials. More specifically, the system comprises:

a furnace containing the molten material;

a sealed recipient for receiving filtered molten material, the recipient being coupled to the furnace with a pipe having one end submerged in the molten material in the furnace and comprising a syphon provided with a filter, and the other end in the recipient; and a pump coupled to the recipient to remove air therefrom and maintain a vacuum, whereby upon starting the pump, the molten material is drawn from the furnace to the recipient through the filter in the pipe, and the filtered molten material is recovered in the recipient.

In a preferred embodiment, the system is used for filtering magnesium oxide particles from molten magnesium chloride electrolyte and the recipient is coupled to a magnesium electrolysis cell that receives the filtered molten magnesium chloride electrolyte.

In a further embodiment of the present invention, the system is used for filtering solid particles from molten metals like magnesium and aluminum. The recipient receiving the filtered molten metal is then coupled to a die casting mold, and the metal may then be die cast in a continuous manner.

In another aspect of the present invention, there is also disclosed a method for the filtration of molten material, the method comprising the steps of:

continuously feeding material to a furnace to melt the material, the furnace being coupled to a sealed recipient with a pipe having one end submerged in molten material in the furnace and comprising a syphon provided with a filter, the other end of the pipe being in the recipient, the recipient having a pump coupled thereto to remove air and maintain a vacuum;

starting the pump to create and maintain a vacuum in the recipient, thus drawing the molten material from the furnace into the recipient through the filter and the pipe; and recovering filtered molten material.

In a further embodiment, the present method may advantageously be used in combination with die casting operations like die casting of aluminum of magnesium, or electrolysis operations like magnesium electrolysis.

The pore size of the filter is preferably from 5 to 200 $\mu$m, and the concentration of solid remaining in the filtered molten material is less than 0.05 wt %.

IN THE DRAWINGS

DETAILED DESCRIPTION OF THE INVENTION

The invention relates to a system and method for removing insoluble impurities from any molten material such as fused salt electrolyte used in the purification of metals, molten metals, molten alloys and the like. The present method can be combined, for example, with the electrolytic production of metals like magnesium, aluminum etc., or with die casting operations.

The present invention provides an alternative to the production of solid particle/oxide free feed for electrolysis cells. The method comprises filtering solid particles like MgO, sulphates, etc. from either molten magnesium chloride, a molten magnesium chloride-containing electrolyte or any other high temperature molten salt electrolyte contaminated with solids. The present method thus allows the production of a refined anhydrous, substantially oxide-free feed to the electrolysis cell.

The present invention can also be used for filtering molten metal such as aluminum and magnesium in a continuous manner prior to die casting operations for producing molded part of metal.

The present invention has tremendous economic advantages over chemical methods of removing MgO from magnesium chloride electrolyte:

i) the capital expenditure for a system adapted to perform such method is a fraction of that required for a chemically based elimination of MgO and other oxides, because injection systems introducing HCl, $Cl_2$ and/or CO during $MgCl_2$ chlorination are eliminated. This greatly simplifies the gas handling system, and reduces the need for special and expensive safety and emergency equipment;

ii) chlorinated hydrocarbons (CHC) formation in the purification step is eliminated;

iii) reduced operating cost resulting from elimination of reactive gases, including gas cost and corrosion damage; maintenance cost reduction, i.e., elimination of electricity and maintenance costs for electromechanical gas injection devices; and reduced environmental and hygiene costs, i.e., elimination of treatment and disposal costs for CHC containing solutions;

iv) the MgO retrieved from the filtration can be recirculated to the neutralization of the leach slurry at the hydrometallurgical section of the plant.

Further features, objects and advantages will be evident from the following detailed description of preferred embodiments of the present invention taken in conjunction with the accompanying drawings.

Figure 1:
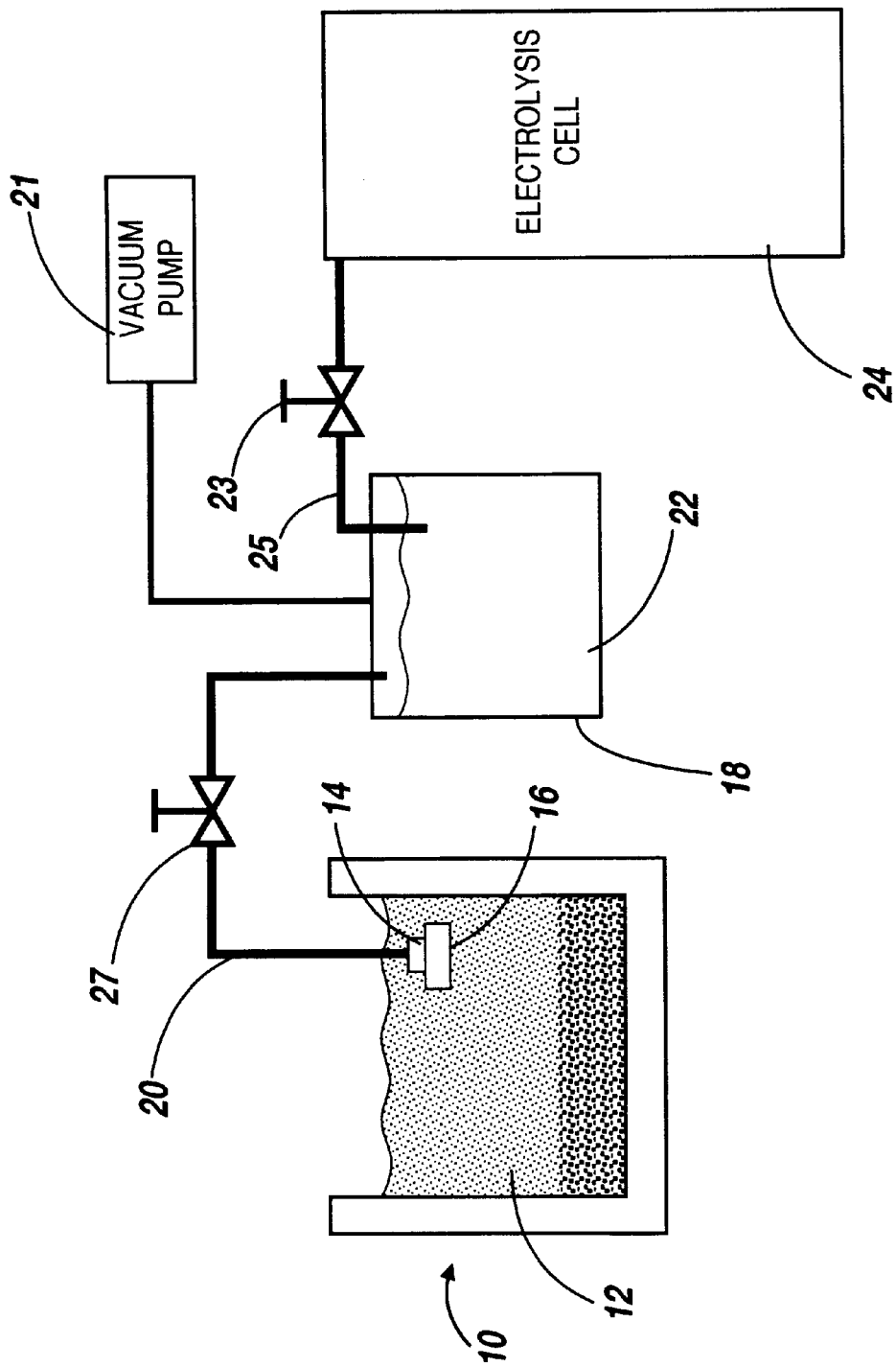
FIG. 1 illustrates a system for filtering magnesium oxide in combination with a magnesium electrolysis cell.

As illustrated in FIG. 1, the system comprises melting $MgCl_2.xH_2O$ prills in a furnace 10 containing molten $MgCl_2$ electrolyte 12. The prills may be fed continuously or batchwise. The upper portion of the melt is filtered through a syphon 14 fitted with a filter 16 into a sealed vacuum transfer recipient or ladle 18 through a pipe 20 with the help of a vacuum pump 21 to remove any undesirable MgO particles. Pump 21 removes air from ladle 18 and maintains vacuum therein, thus drawing molten electrolyte in the ladle through pipe 20. During this operation, valve 23 on pipe 25 is closed. When ladle 18 is substantially filled with filtered $MgCl_2$ electrolyte 22 containing less than 0.05% MgO, valve 27 is closed, pump 21 is stopped and valve 23 is opened. Positive pressure is then induced in ladle 18 by injecting therein dry air, or preferably an inert gas such as nitrogen, argon and the like, either through pump 21 or any other injection means, to transfer filtered molten electrolyte to electrolysis cell 24. Any other means of transferring the filtered electrolyte to the electrolysis cell may be used provided that the seal of ladle 18 is not broken. The depleted electrolyte, wherein the prills are fed, can be the electrolysis cell electrolyte, the composition of which being conventional. For example, such electrolyte contains from 15 to 25 wt % of $MgCl_2$, from 10 to 25 wt % of $CaCl_2$, and from 45 to 65 wt % of NaCl. The $MgCl_2$ content is increased to between 45–55 wt % in the melting furnace 10 by the addition of partially dehydrated $MgCl_2$.

It has unexpectedly been found that it is advantageous to dissolve the prills in the electrolyte for one key reason: when prills are dissolved in an electrolyte of NaCl and $CaCl_2$, it has the effect of considerably reducing the activity of $MgCl_2$, thus minimizing the thermodynamic driving force for the hydrolysis of $MgCl_2$. Thermodynamic calculations show that the equilibrium quantity of MgO in the melt should be in the order of 6–8 wt %, and experimental evidence has confirmed these calculations. If hydrated prills are melted without the presence of the electrolyte dilution, the consequences are that nearly all the moisture reacts to form MgO and consumes nearly all the $MgCl_2$, thereby causing the subsequent filtration of MgO not cost effective, in other words, useless commercially.

The $MgCl_2$ prills may be replaced with spray dried $MgCl_2$ (approximately 5 wt % MgO, 5 wt % $H_2O$) as the feed material in furnace 10. In this case, electrolytes of almost any $MgCl_2$ concentration can be used due to the much reduced moisture level. Preferably, however, the $MgCl_2$ concentration should be between 35 and 85 wt %, and most preferably between 40 and 50 wt %.

Figure 2:
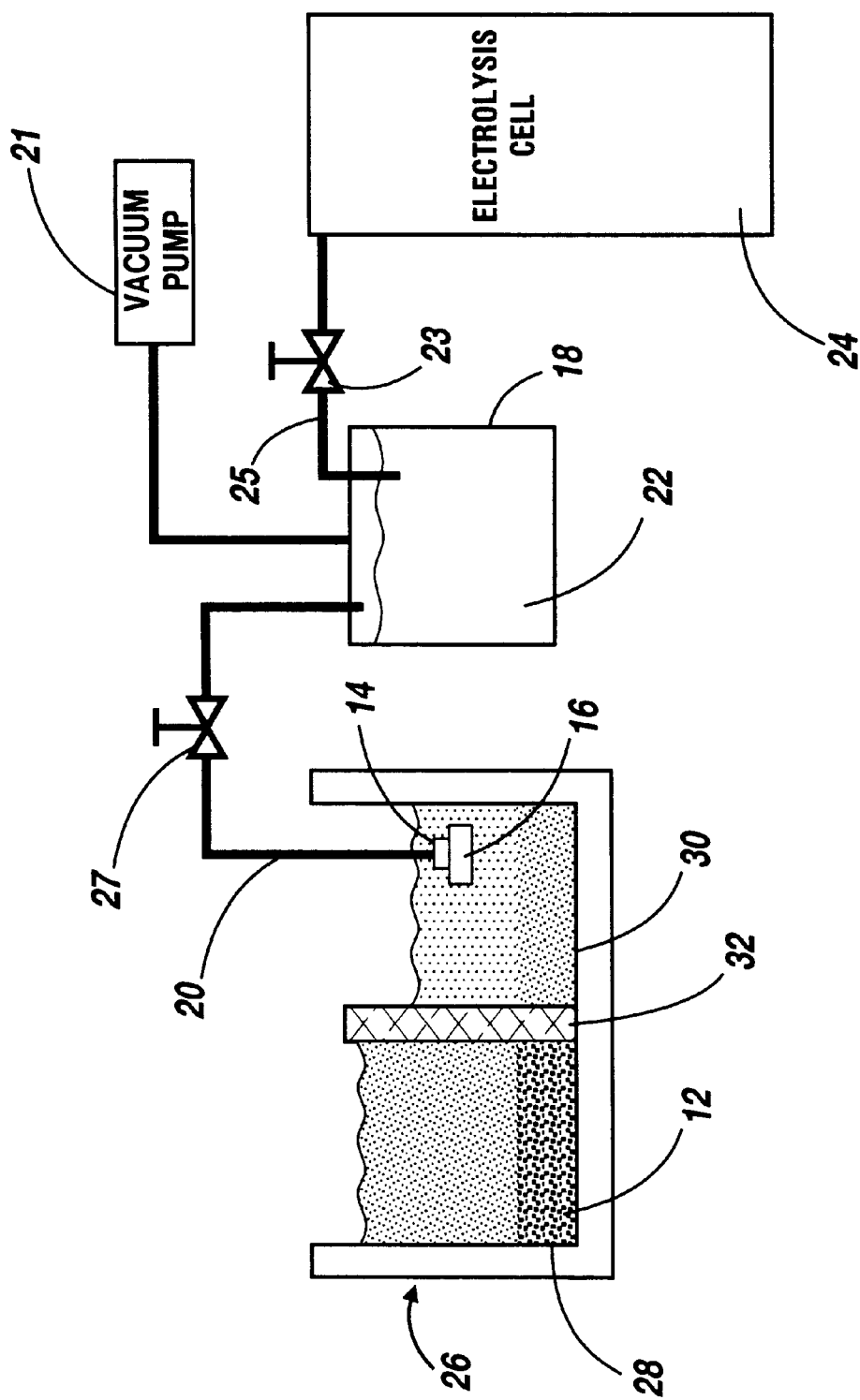
FIG. 2 illustrates a second embodiment of a system for filtering magnesium oxide in combination with a magnesium electrolysis cell.

In the embodiment illustrated in FIG. 2, instead of having a single melting furnace 10, a 2 or more stages furnace 26 is provided. In the first stage, the feed is added and the large particles settle to the bottom into an optional basket (not shown) that allows easy recovery. Between the subsequent chambers 28 and 30, a ceramic foam filter 32 is placed. Overflow weirs (not shown) can also be used between successive chambers. This reduces mixing between the melting & settling chamber 28 and filtration chamber 30, thereby minimizing the number of oxide particles passing through to the next stage, that is, filtrated through syphon 14. The partition wall arrangement can be repeated between subsequent stages. Although FIG. 2 illustrates a furnace with only one melting and settling chamber 28, the furnace may resemble the refining furnace disclosed in U.S. Pat. No. 4,385,931, which uses a series of chambers to settle out impurities, the chambers being separated with a filter. Lastly, the top portion of the electrolyte in the final chamber is syphoned through filter 16 and the MgO free electrolyte enriched in $MgCl_2$ can be fed to the electrolysis cell 24 in a manner similar to that described above. In whatever manner the process is implemented, the MgO from the filtration is generally recycled back to the front end of the plant where it replaces purchased MgO for neutralization. Great savings are acquired by the recirculation of MgO from the hot sector to the purification stage.

Figure 3:
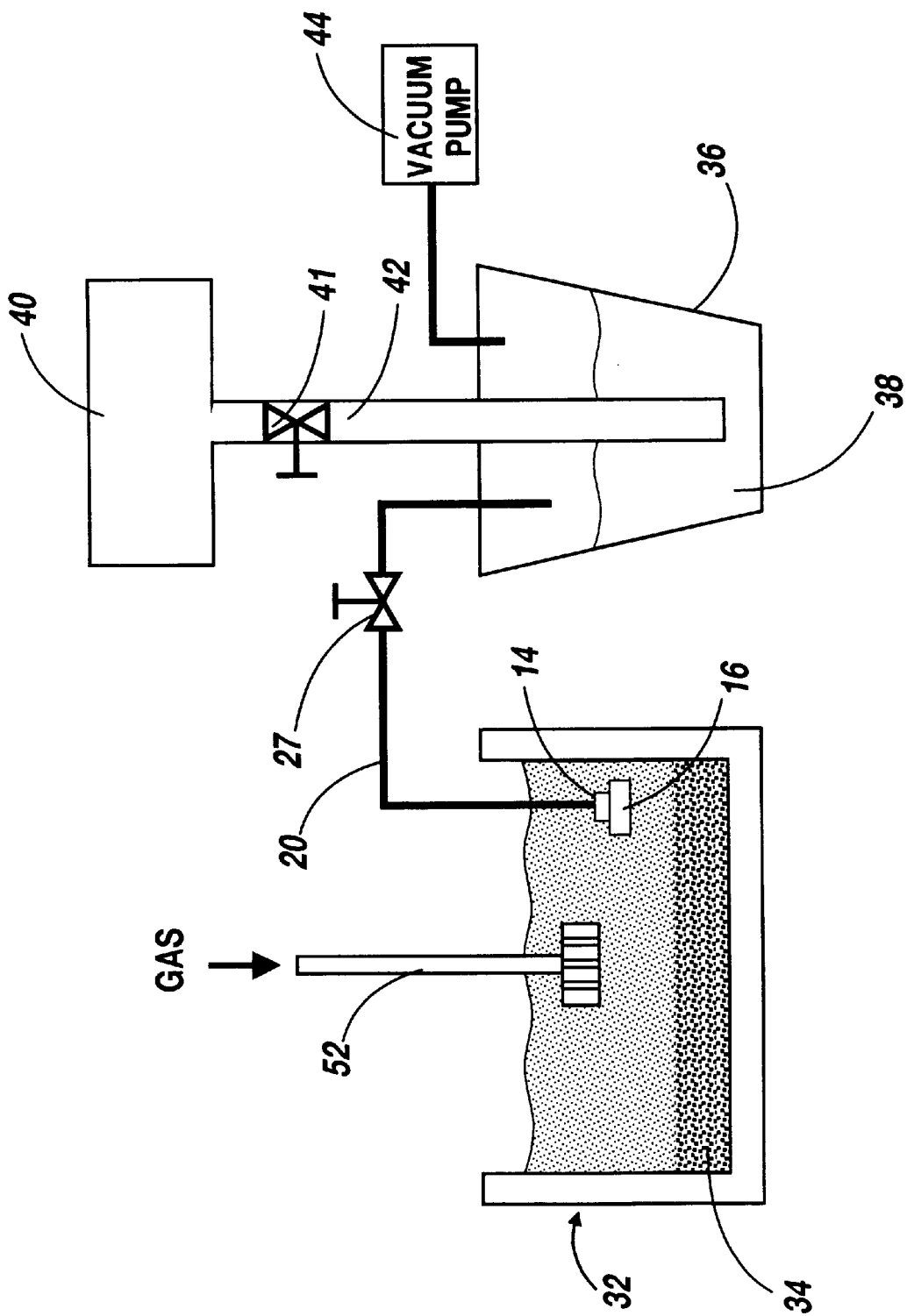
FIG. 3 illustrates a system for filtering solid particles from molten metal in combination with die casting operations.

In FIG. 3, which illustrates a die casting system, molten metal is melted in a furnace 32 containing molten metal 34 like magnesium, aluminum and the like in a continuous manner, and filtering the melt through a syphon 14 fitted with a filter 16 into a casting vessel 36 through pipe 20 with the help of a vacuum pump 44 to remove any undesirable solid particles. The filtrated molten metal 38, can then be transferred to a mold 40 via pipe 42 by closing valve 27, stopping pump 44 and opening valve 41, followed by the injection of dry air or preferably an inert gas in vessel 36, either through pump 44 or by any other injection means, to force the molten metal in mold 40. Mold 40 should preferably have been purged with an inert gas at high temperature to remove any trace of moisture. Filtrated molten metal 38 is periodically pumped in vessel 36 so that the lower portion of pipe 42 is always submerged in the molten metal. In this manner, any oxide present on the surface of the molten metal will not penetrate in the mold and contaminate the metal. Further, since the pressure seal in the die casting vessel is not broken during and between die casting operations, the latter can be carried out in a continuous manner.

Figure 4:
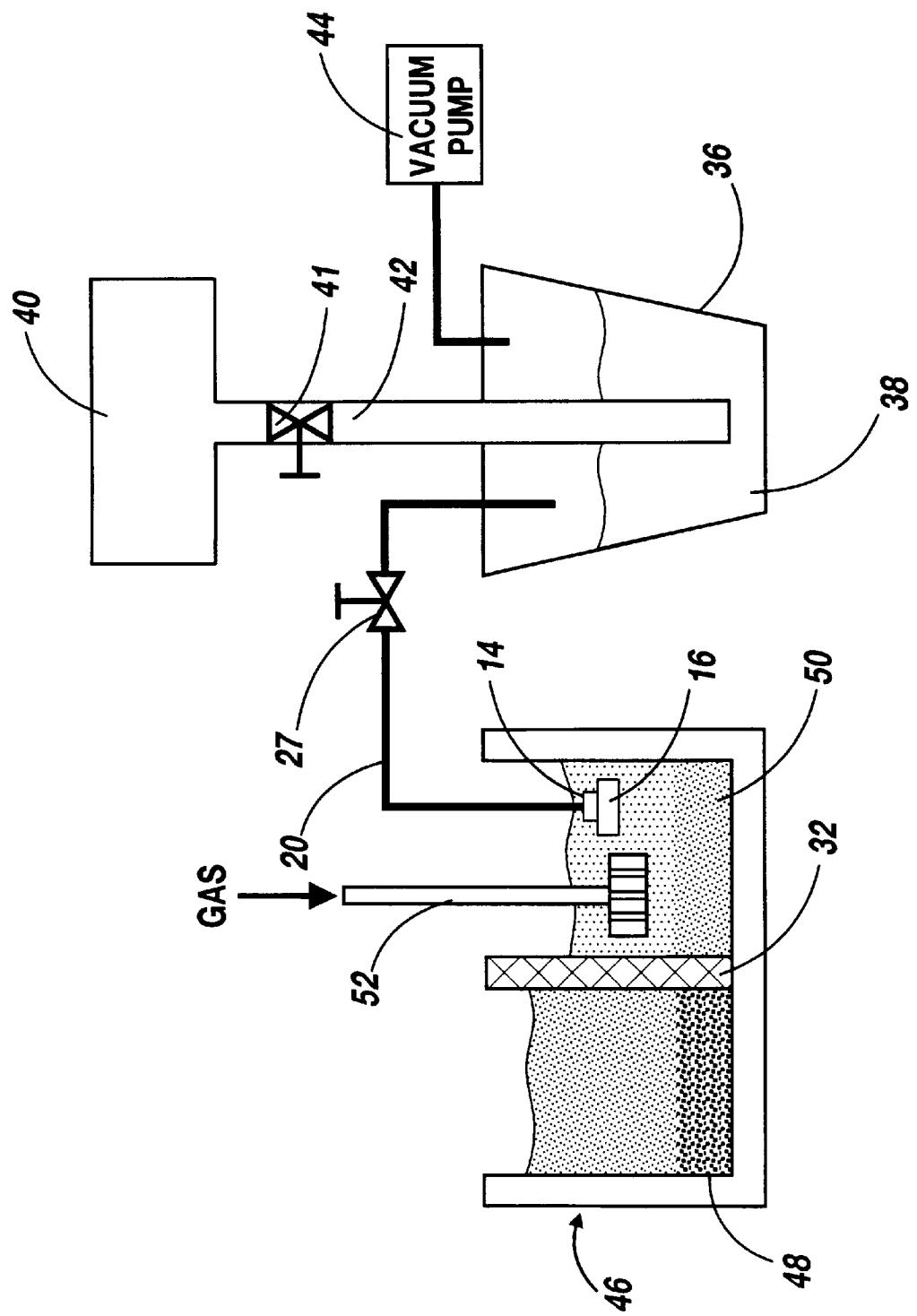
FIG. 4 illustrates a second embodiment of a system for filtering solid particles from molten metal in combination with die casting operations.

FIG. 4 illustrates also a die casting system, but this time, furnace 32 has been replaced with a 2 or more stages furnace 46, which is operated in a manner similar to that described in FIG. 2 above. Briefly, the metal is added and the large particles settle to the bottom into an optional basket (not shown) that allows easy recovery. Chambers 48 and 50 are separated by a ceramic foam filter 32. Overflow weirs (not shown) can also be used between successive chambers. The partition wall arrangement can be repeated between subsequent stages. The second stage, which comprises filtration through syphon 14 and filter 16 is identical to that described in FIG. 3, and the die casting operation for transferring the molten metal in the mold are the same.

In the embodiments of FIGS. 3 and 4, a gas such as chlorine, an inert gas or mixture thereof is preferably added in the furnace through an impeller 52 or otherwise, to remove any gaseous species present in the melt which could create inclusion in the molded article. The gas removal efficiency is obviously increased with the use of impeller 52. Such impeller could also be used in the furnaces illustrated in FIGS. 1 and 2.

The filters used in the present method must be able to sustain corrosive environment, as well as the high pressures involved during filtration. Also the pore size must be small enough to capture all the magnesium oxide and other solids, while simultaneously be large enough to prevent plugging of the pores. Preferred materials for the filters include alumina or silica based ceramics, stainless steel, carbon steel, or any other material that meets the required criteria mentioned in the paragraph. All these filters are well known in the art and readily available commercially. In operation, the filters will require replacement when filtration rate is reduced, particularly in continuous operations, or upon completing filtration in a vacuum ladle or a die casting vessel. The filters may be cleaned and recycled by reaction with an appropriate acidic cleaning solution. For example, nitric acid will quickly and efficiently clean stainless steel filters, while hydrochloric acid is preferred for ceramic filters. Since the size of magnesium oxide particles does not exceed 15 $\mu$m, the pore size is preferably of 5–200 $\mu$m, and more preferably 5–50 $\mu$m.

A number of papers report on the solubility of MgO in chloride electrolytes (see for example Combes et. al. in *Elect.Acta.*, 1980, 25, 371–374). The solubility of MgO is reported to be in the order to $10^{-6}$ at temperatures between 600 and 900° C. Essentially, this indicates that oxides exist in fused salt melts as solid particles and are not dissolved to any appreciable level, meaning that under appropriate conditions, the particles could be filtrated. When dealing at these temperatures, the greatest concern is that the solubility of the oxide is greater than the acceptable limit in the electrolysis cell, which would then require the use of a chemical reaction method to eliminate the MgO.

Sedimentation of MgO inclusions in molten electrolyte was studied, and it was determined that the lowest MgO concentration achievable from pure settling is in the order of 0.18–0.2 wt %, provided a very long holding time and absolutely no agitation or stirring. On the other hand, the amount of MgO remaining in the molten electrolyte after being filtrated according to the present method is less than 0.05 wt %.

The experimental conditions are as follows: a magnesium chloride electrolyte containing about 25 wt % $MgCl_2$, 20 wt % $CaCl_2$, and about 55 wt % NaCl is molten at 650° C. and doped with about 6 wt % MgO. The filtration apparatus consisted in an Edwards E1M5 High Vacuum Pump with stainless steel piping. A Mott stainless steel cup filter with 40 $\mu$m nominal pore openings is used to filter the electrolyte. The vacuum in the feed line was about 736 mmHg. To prevent clogging in the pipe and filter, all the piping system and the ladle are preferably heated.

The results from these tests demonstrate beyond any doubt that settling/filtering combination can eliminate MgO to levels less than 0.05 wt % without any problem. In these tests, the MgO level in the filtrate is 0.01 wt %. Laboratory results are given in Table 1.

TABLE 1

Typical Vacuum Filtration Results

| Initial concentration MgO (wt %) | Setting time (seconds) | Final concentration MgO (wt %) |
|---|---|---|
| 7.11 | 360 | 0.01 (Detection limit) |
| 6.02 | 75 | 0.01 (Detection limit) |

Subsequently, larger pilot scale tests were performed according to the system illustrated in FIG. 1. Results from these final tests indicated that this system operates successfully, and that temperatures higher than 700° C. for the electrolyte are most preferred. In addition, it was found that the amount of MgO present in the final filtered electrolyte was in the order of <0.05 wt % MgO.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A system for removing solid particles from a molten material, comprising:
   a furnace
   a sealed recipient for receiving filtered molten material, the recipient being coupled to the furnace with a first pipe having one end submerged in the molten material in the furnace and comprising a syphon provided with a filter, and the other end in the recipient;
   a pump coupled to the recipient to remove therefrom and maintain a vacuum, whereby upon starting the pump, the molten material is drawn from the furnace to the recipient through the filter and the pipe; and
   an electrolysis cell coupled to the recipient with a second pipe having one end submerged in the filtered molten material in the recipient, and the other end in the cell, whereby when the recipient is substantially filled, a valve in the first pipe is closed, the pump is stopped and a valve in the second pipe is opened, and dry air or an inert gas is injected in the recipient creating a positive pressure therein forcing the filtered molten material in the cell.

2. A system according to claim 1 wherein the pore size of the filter is from 5 to 200 $\mu$m.

3. A system according to claim 2 wherein the filter comprises alumina or silica based ceramics, stainless steel or carbon steel.

4. A system according to claim 1, wherein said sealed recipient is adapted for receiving a molten magnesium chloride electrolyte or aluminum electrolyte.

5. A system according to claim 4, wherein said sealed recipient is adapted for receiving magnesium chloride electrolyte and wherein the solid particles comprise magnesium oxide.

6. A system according to claim 5, wherein the concentration of magnesium oxide remaining in the filtered molten material is less than about 0.05 wt %.

7. A system according to claim 1, wherein the furnace is divided into a series of at least two compartments, the compartments being separated from each other by a filter, and wherein feed material is introduced into the first compartment of the series, and wherein the pipe is submerged in the molten material of the last compartment of the series.

8. A method for processing a molten material and transferring filtered molten material in an electrolysis cell, the method comprising the steps of:

continuously feeding the material to a furnace to melt the material, the furnace being coupled to a sealed recipient by a first pipe having one end submerged in the molten material in the furnace and comprising a syphon provided with a filter, and the other end in the recipient, the recipient having a pump coupled thereto to remove air and maintain a vacuum, and the recipient also having an electrolysis cell coupled thereto via a second pipe having one end submerged in the molten material in the recipient, and the other end in the cell;

starting the pump to create and maintain a vacuum in the recipient, thus drawing the molten material from the furnace into the recipient through the filter and the first pipe and removing solid articles from the molten material;

closing a valve in the first pipe, stopping the pump and opening a valve in the second pipe; and injecting dry air or an inert gas in the recipient to create a positive pressure forcing the molten material in the cell.

9. A method according to claim 8, wherein the pore size of the filter is from 5 to 200 $\mu$m.

10. A method according to claim 8, wherein the filter comprises alumina or silica based ceramics, stainless steel or carbon steel.

11. A method according to claim 8, wherein the molten material comprises magnesium chloride electrolyte or aluminum electrolyte.

12. A method according to claim 11, wherein the molten material comprises magnesium chloride electrolyte and the solid particles comprise magnesium oxide.

13. A method according to claim 11, wherein the concentration of magnesium oxide remaining in the filtered molten material is less than about 0.05 wt %.

14. A method according to claim 8, wherein the furnace is divided into a series of at least two compartments, the compartments being separated from each other by a filter, wherein feed material is introduced into the first compartment of the series, and wherein the pipe is submerged in the molten material in the last compartment of the series.

15. A method for die casting molten material continuously comprising:

feeding material to a furnace to melt the material, the furnace being coupled to a sealed recipient with a first pipe having one end submerged in the molten material in the furnace and comprising a syphon provided with a filter, the other end of the pipe being in the recipient, the recipient having a pump coupled thereto to remove air and maintain a vacuum; and the recipient also having a mold for die casting coupled thereto via a second pipe having one end submerged in the molten material in the recipient, and the other end in the mold;

starting the pump to create and maintain a vacuum in the recipient, thus drawing the molten material from the furnace into the recipient through the filter and the first pipe;

closing a valve in the first pipe, stopping the pump and opening a second valve in the second pipe; and injecting dry air or an inert gas in the recipient to create a positive pressure forcing the molten material into the mold.

16. A method according to claim 15 wherein the material is aluminum or magnesium.

17. A method according to claim 15, wherein the pore size of the filter is from 5 to 200 $\mu$m.

\* \* \* \* \*